United States Patent
Jo et al.

(10) Patent No.: US 8,998,251 B2
(45) Date of Patent: Apr. 7, 2015

(54) HORN SWITCH DEVICE FOR STEERING WHEEL

(71) Applicant: Hyundai Motor Company, Seoul (KR)

(72) Inventors: Sang Min Jo, Jeonju-si (KR); Jin Ho Bae, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/094,414

(22) Filed: Dec. 2, 2013

(65) Prior Publication Data

US 2014/0352477 A1 Dec. 4, 2014

(30) Foreign Application Priority Data

Jun. 3, 2013 (KR) ........................ 10-2013-0063324

(51) Int. Cl.
*B60R 21/203* (2006.01)
*B60Q 5/00* (2006.01)
*B62D 1/04* (2006.01)

(52) U.S. Cl.
CPC ..................................... *B60Q 5/003* (2013.01)

(58) Field of Classification Search
CPC . B60R 21/2037; B60R 21/2035; B60Q 5/003
USPC .............................. 280/731; 200/61.54, 61.55
See application file for complete search history.

(56) References Cited

U.S. PATENT DOCUMENTS

| 2005/0151354 A1* | 7/2005 | Sugimoto | 280/731 |
| 2005/0248135 A1* | 11/2005 | Poli et al. | 280/731 |
| 2013/0154242 A1* | 6/2013 | Sato et al. | 280/728.2 |

FOREIGN PATENT DOCUMENTS

| JP | 2006-213147 A | 8/2006 |
| JP | 2006-331657 A | 12/2006 |
| KR | 10-0477245 B1 | 3/2005 |
| KR | 10-2006-0020748 A | 3/2006 |
| KR | 10-2008-0008110 A | 1/2008 |
| KR | 10-0888163 B1 | 3/2009 |

* cited by examiner

*Primary Examiner* — Ruth Ilan
(74) *Attorney, Agent, or Firm* — Morgan, Lewis & Bockius LLP (57) ABSTRACT

A horn switch device for a steering wheel may include an airbag module mounted in an inner region of the steering wheel to perform pressing and restoring operations while being elastically supported by a plurality of horn springs, a link plate assembly mounted on a lower surface of the airbag module and including a plurality of link plates to facilitate a seesaw movement, a module-side horn contact point positioned at the fixed end portion of each link plate and toward the outside of the airbag module, and a wheel-side horn contact point positioned below the module-side horn contact point. A horn operation is produced when the wheel-side horn contact point contacts with the module-side horn contact point.

9 Claims, 9 Drawing Sheets

HORN SWITCH DEVICE FOR STEERING WHEEL

CROSS-REFERENCE TO RELATED APPLICATION

The present application claims priority of Korean Patent Application Number 10-2013-0063324 filed on Jun. 3, 2013, the entire contents of which application are incorporated herein for all purposes by this reference.

BACKGROUND OF INVENTION

1. Field of Invention

The present invention relates to a horn switch device for a steering wheel. More particularly, the present invention relates to a horn switch device mounted in a steering wheel of a vehicle so as to generate an alarm sound by a user's intention.

2. Background Art

In general, an airbag assembly and a horn switch device are mounted in a steering wheel of a vehicle. Here, the airbag assembly safely protects a driver from a collision or overturn of the vehicle, and the horn switch device generates an alarm sound by a driver's intention.

The horn switch device is disposed at a rear side of the airbag assembly disposed at a front side of the steering wheel. When the driver presses the airbag assembly, the horn switch device forms a contact point, thereby generating a horn sound.

As the horn switch device mounted together with the airbag assembly in the steering wheel, various types of ones have been disclosed in Korean Patent No. 10-0477245, Korean Patent Application Publication Nos. 10-2006-0067563 and 10-2006-0020748, Japanese Patent Application Publication No. 2006-331657, etc.

Figure 1:
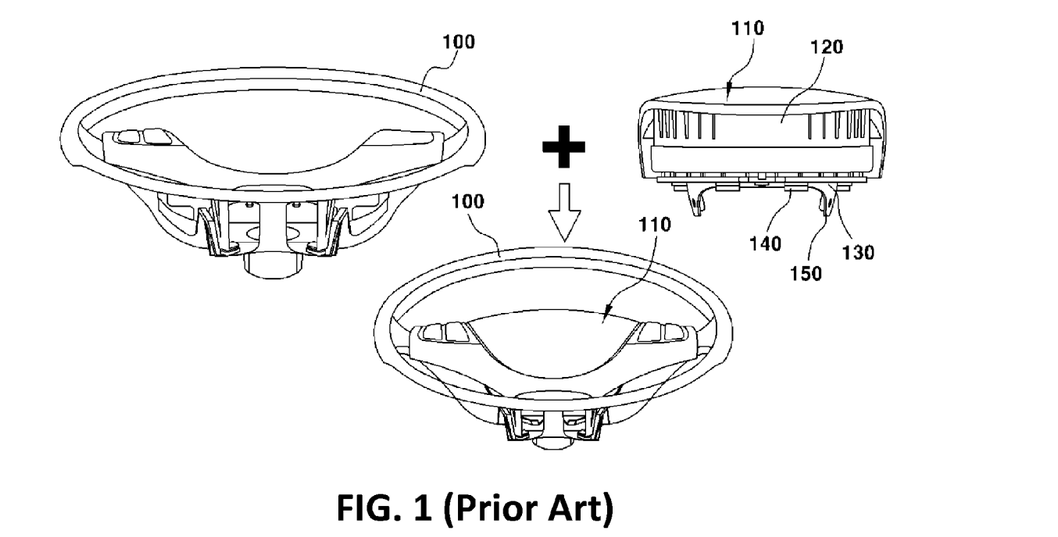
FIG. 1 is a perspective view showing a conventional horn switch device for a steering wheel.
Figure 2:
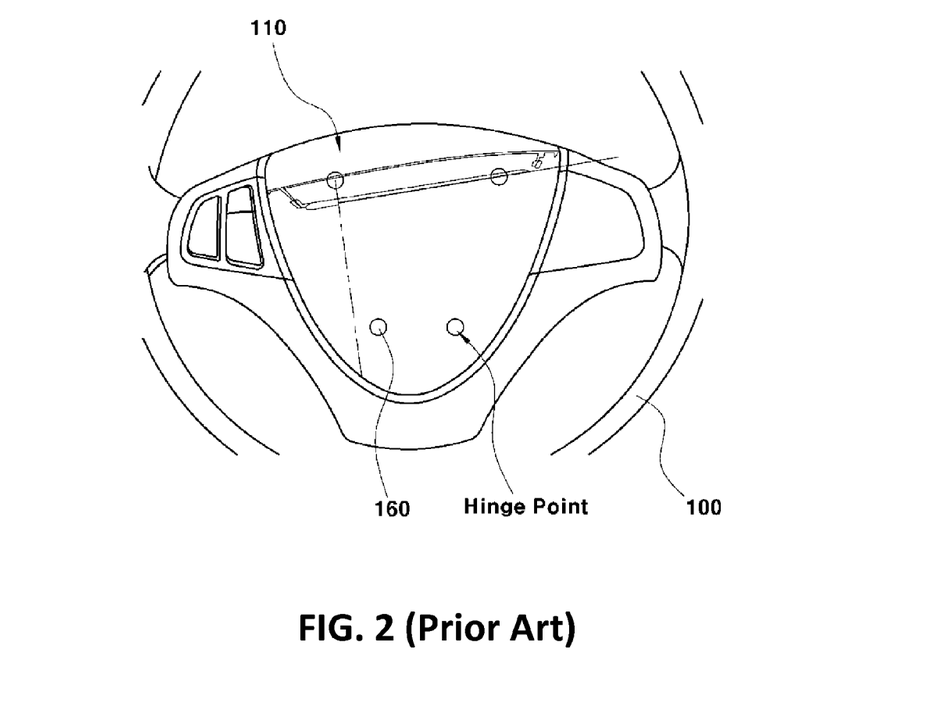
FIG. 2 is a front view showing the conventional horn switching device.
Figure 3:
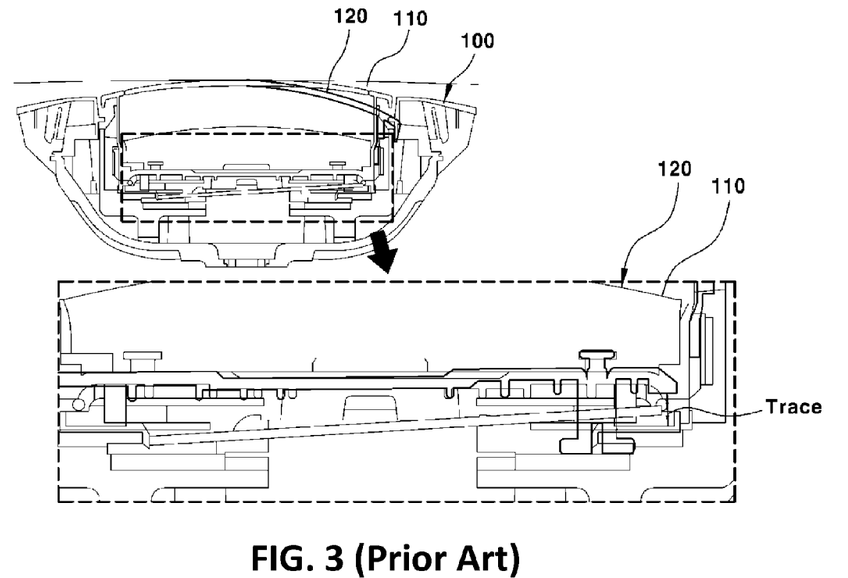
FIG. 3 is a sectional view showing an operating state of the conventional horn switch device.

An example of the horn switch device will be described as follows. FIGS. 1 and 2 are perspective and front views showing a conventional horn switch device for a steering wheel. FIG. 3 is a sectional view showing an operating state of the conventional horn switch device. As shown in FIGS. 1 and 2, a steering wheel 100 and an airbag assembly 110 are provided, and the airbag assembly 110 is disposed inside the steering wheel 100. The airbag assembly 110 is mounted in the steering wheel 100 in a bolt fastening structure.

The airbag assembly 110 includes an airbag module 120 and a mounting plate 130. The airbag module 120 is elastically supported by a horn spring 140 disposed at a rear side thereof, and the mounting plate 130 is fastened to the steering wheel 100 through a mounting point 150 at a lower end thereof.

Thus, if a driver presses an arbitrary point on the front side of the airbag module 120, the airbag module 120 presses the horn spring 140 so that a contact point mounted in the mounting plate 130 contacts a contact point mount in the airbag module 120, thereby ringing a horn.

However, the conventional horn switch device has several problems as follows. As shown in FIG. 3, if the airbag module 120 is pressed to operate the horn, that is, if a cover of the airbag module 120 is pressed, the horn spring 140 acts as a hinge point 160 as the airbag module 120 is restricted by the horn spring 160. Accordingly, one side of the airbag module 120 is inclined with the trace of an arc having long radius and small angle, thereby contacting a contact point of the horn.

Therefore, the gap between the airbag module 120 and the steering wheel 100 is narrowed as can be seen in FIG. 3. If the gap is narrowed as described above, there are a lot of limitations in designing the horn switch device. Further, the horn does not ring due to a lack of the gap, and therefore, it is highly likely that the horn switch device may be decided as a failure.

In addition, if the gap is considerably increased for the purpose of gap insurance, the inside of the steering wheel may be seen in appearance.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a horn switch device for a steering wheel, in which a link plate assembly linked with an operation of an airbag module is applied, so that it is possible to implement a new method for operating a horn switch in a vertical direction in which the horn switch can be operated by vertically moving the airbag module through an operation of the link plate assembly using the lever principle when the airbag module is pressed, thereby improving the degree of freedom in designing the horn switch device and secure the operational quality of the horn switch device.

In various aspects, the present invention provides a horn switch device for a steering wheel, including: an airbag module mounted in an inner region of the steering wheel to perform pressing and restoring operations while being elastically supported by a plurality of horn springs; a link plate assembly mounted on a lower surface of the airbag module and including a plurality of link plates to facilitate a seesaw movement, wherein each link plate includes one end portion fixed to the airbag module at an outside of the airbag module, the other end portion coupled together with the other end portions of other link plates in the plurality of link plates at a center of the airbag module, and a central portion supported by a link plate support formed in the steering wheel; a module-side horn contact point positioned at the fixed end portion of each link plate and toward the outside of the airbag module; and a wheel-side horn contact point positioned below the module-side horn contact point, wherein a horn operation is produced when the wheel-side horn contact point and the module-side horn contact point contact with each other.

Thus, the module-side horn contact point of each link plate may be simultaneously contacted with the wheel-side horn contact point of each link plate by an operation of the link plate assembly through a vertical movement of the airbag module, thereby performing a horn operation.

In one aspect, the link plate assembly may include first, second and third link plates coupled in a "Y" shape while end portions of the first, second and third link plates that are fixed to the airbag module at the outside of the airbag module form a triangular arrangement structure.

In another aspect, both ends of each horn spring elastically supporting the airbag module may be respectively fixed to the link plate assembly and the steering wheel at positions corresponding to the fixed end portion of each link plate of the link plate assembly.

In still another aspect, a boss portion of the airbag module may be fixed to the fixed end portion of each link plate and positioned toward the outside of the airbag module. One end portion of the boss portion that contacts with the link plate may be formed with an inclined surface in consideration of a trace of the link plate.

In yet another aspect, a buffering rubber may be attached to a surface of the link plate support formed in the steering wheel, thereby preventing impact or abrasion.

In still yet another aspect, the link plate support formed in the steering wheel may include guide supports for preventing separation of the link plate, wherein the guide supports are formed substantially vertically from both sides of the link plate support and each has a link plate latching hook formed at an upper-end portion thereof.

The horn switch device for the steering wheel according to the present invention has advantages as follows. First, the horn switch is vertically operated by the airbag module moved in the vertical direction, thereby reducing the gap between the steering wheel and the airbag module. Accordingly, it is possible to prevent the inside of the steering wheel from being seen in appearance, and it is unnecessary to extend a shield for covering the inside of the steering wheel.

Second, the gap between the steering wheel and the airbag module is reduced, so that it is possible to prevent a problem of quality such as the non-operation of a horn, caused by horn interference. Accordingly, the failure rate of the horn switch device can be lowered, thereby improving a production yield.

Third, the operational trace of the horn switch is vertically simplified, thereby improving the degree of freedom in designing the horn switch device. Accordingly, it is possible to more freely design the horn switch device in consideration of perceived quality, thereby improving the perceived quality.

In addition, the degree of freedom in designing the horn switch device is increased, so that it is possible to reduce manufacturing cost through a simplified design in the gap between the steering wheel and the airbag module and a simplified manufacturing process.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4A:
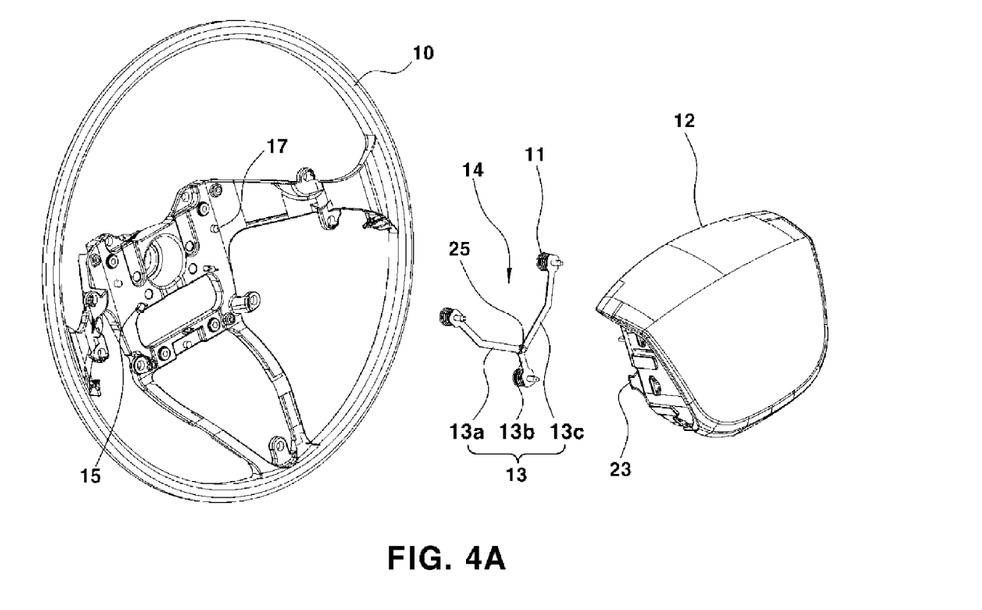
FIGS. 4A, 4B and 4C are perspective views showing a horn switch device for a steering wheel according to the present invention.
Figure 4B:
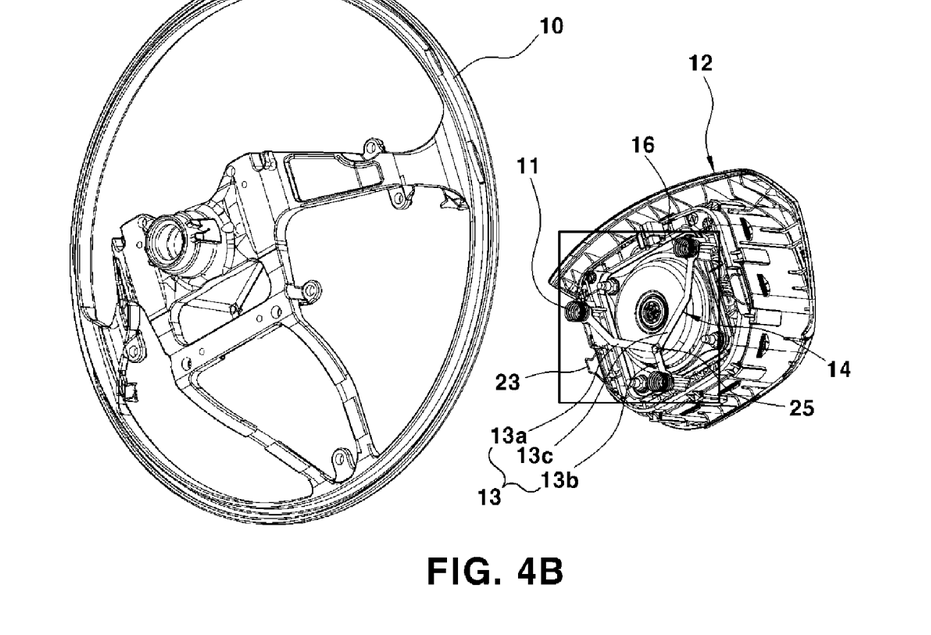
Figure 4C:
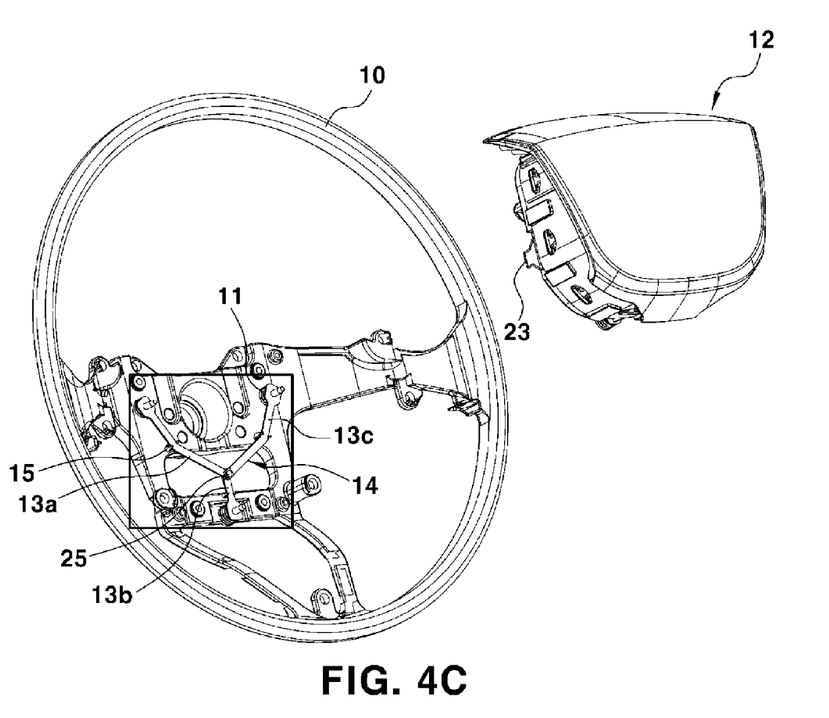
Figure 5:
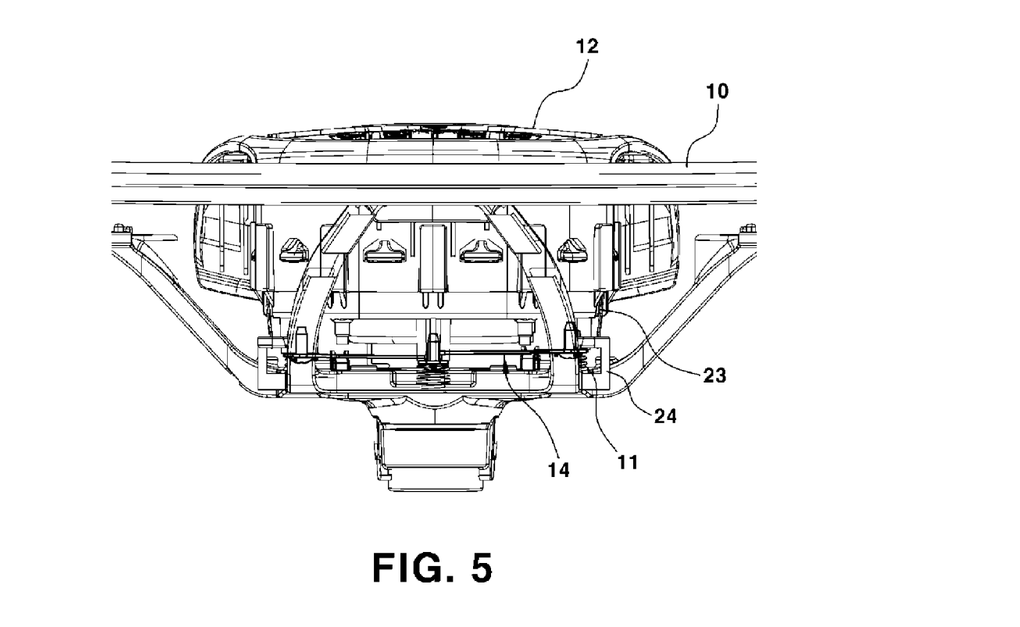
FIG. 5 is a base view showing the horn switch device according to the present invention.
Figure 6:
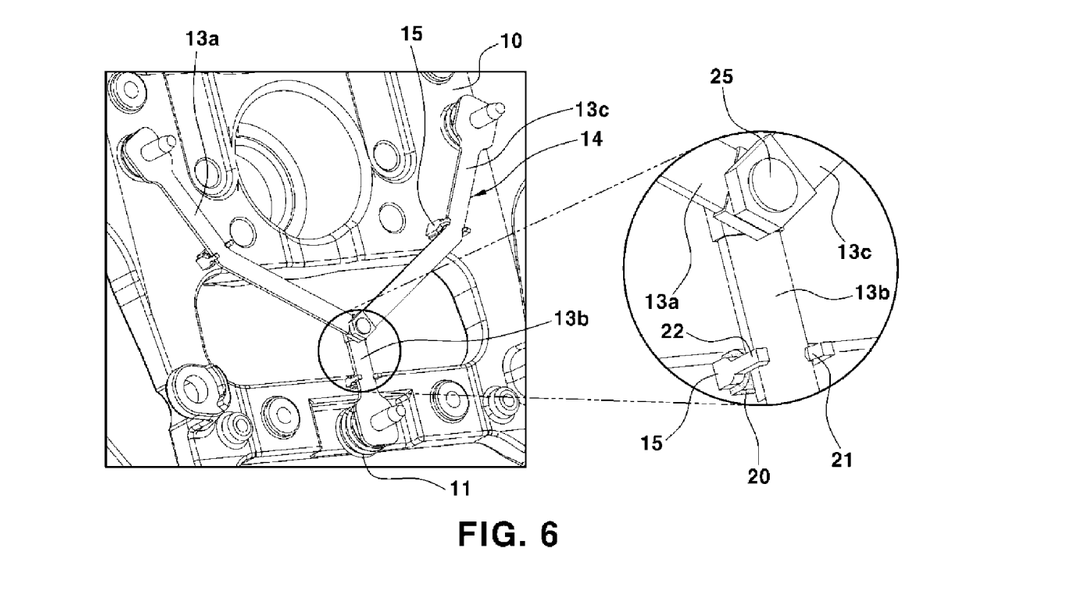
FIG. 6 is an enlarged view of a main portion of FIG. 4B.
Figure 7:
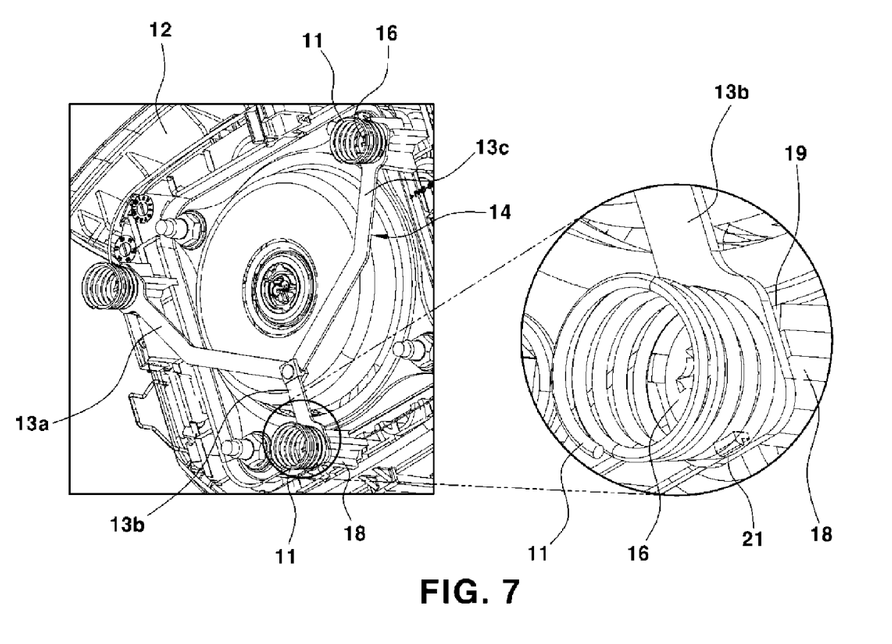
FIG. 7 is an enlarged view of a main portion of FIG. 4C.

FIGS. 4A to 4C are perspective views showing a horn switch device for a steering wheel, and FIG. 5 is a base view showing the horn switch device according to various embodiments of the present invention. FIG. 6 is a main portion enlarged view of FIG. 4B. FIG. 7 is a main portion enlarged view of FIG. 4C.

As shown in FIGS. 4A to 4C and 5, the horn switch device has a structure in which a horn contact point is turned on/off by a vertical movement of a center module, for example, an airbag module, using a link plate assembly that performs a seesaw movement in connection with press manipulation of the airbag module, so that it is possible to reduce the gap between the steering wheel and the airbag module.

To this end, the center module or airbag module 12 is disposed in an inner region of the steering wheel 10. The airbag module 12 disposed as described above is mounted to the steering wheel 10 in a structure in which the airbag module 12 can perform pressing and restoring operations while being elastically supported by a plurality of horn springs 11, e.g., three horn springs 11 interposed between an upper surface of the steering wheel 10 and a lower surface of the airbag module 12.

Accordingly, if a driver presses a front side of the airbag module 12 with a driver's hand, the airbag module 12 can be pressed downward by compressing the horn spring 11. If the driver takes off the hand from the airbag module 12, the airbag module 12 can be restored to the initial position while being ascended by the restoring force of the horn spring 11.

Here, the horn spring 11 may be mounted into a structure in which one end of the horn spring 11 is fixed to the position of a module-side fixing portion of each link plate 13 constituting the link plate assembly 14, i.e., the end portion of the link plate 13 fixed to a boss portion 18 in the airbag module 12, by a link plate latching hook 21 described later (see FIG. 6), and the other end of the horn spring 11 is fixed to the front side of the steering wheel 10 by a latching structure, bracket, etc.

Latching rings 23 are respectively formed at lower portions of both sides of the airbag module 12. The latching rings 23 are latched to both latching hook 24 formed in the steering wheel 10, so that the latching action between the latching ring 23 and the latching hook 24 can prevent the airbag module 12 receiving the elastic force of the horn spring 11 from being vertically separated.

A plurality of boss portions 18, e.g., three boss portions 18 respectively positioned at the apexes of a triangle are formed on the lower surface of the airbag module 12. In this case, the end portion of each link plate in the link plate assembly 14, i.e., the end portion positioned toward the outside of the airbag module 12 may be fixed to the boss portion 18.

One of end portions of the boss portion 18, i.e., end portions of the boss portion 18 with which the link plate 13 is contacted, is formed as an inclined surface 19 or curved surface. Thus, the boss portion 18 does not interfere with the movement of the link plate 13.

In order to turn on/off the horn switch device, there are provided a module-side horn contact point 16 and a wheel-side horn contact point 17, which can come in contact with each other. The module-side horn contact point 16 and the wheel-side horn contact point 17 may be mounted, without any limitation of their positions or numbers, in a place where the lower surface of the airbag module 12 and the upper surface of the steering wheel 10 can be opposite to each other.

For example, there may be provided three module-side horn contact points 16 and three wheel-side horn contact points 17. In this case, the three module-side horn contact points 16 may be respectively mounted at positions where the three boss portions 18 having the end portions of the link plate fixed thereto are placed on the lower surface of the airbag module 12. The three wheel-side horn contact points 17 may be respectively mounted at positions corresponding to those of the three module-side horn contact points 16 on the upper surface of the steering wheel 10.

In case of the module-side horn contact point 16 provided to the airbag module 12, the head portion of a screw fastened to fix the end portion of the link plate to the boss portion 18 may be used as a contact point.

Although not shown in these figures, wires are respectively provided to the module-side horn contact point 16 and the wheel-side horn contact point 17, so that it is possible to provide an 'ON' signal when the module-side horn contact point 16 and the wheel-side horn contact point 17 are contacted with each other and to provide an 'OFF' signal when the module-side horn contact point 16 and the wheel-side horn contact point 17 are separated from each other.

Particularly, in the present invention, the link plate assembly 14 is provided as a means for enabling the operation of a horn to be performed through a vertical movement of the airbag module 12 when the driver performs a press operation and when the horn spring is restored.

The link plate assembly 14 is configured by combining a plurality of link plates 13. The link plate assembly 14 is mounted into a structure in which the plurality of link plates 13 are fixed and supported to the lower surface of the airbag module 12 through end portions thereof.

The link plate assembly 14 performs a function of enabling the entire airbag module 12 to be moved in the vertical direction while performing a seesaw movement in connection with pressing and restoring operations of the airbag module 12. In other words, the link plate assembly 14 performs a function of enabling all the module-side horn contact points 16 in the airbag module 12 to be simultaneously contacted with the respective wheel-side horn contact points 17.

To this end, one end portions of the plurality of link plates 13, e.g., three link plates 13 including first, second and third link plates 13a, 13b and 13c, are respectively fixed to the boss portions 18 arranged at outsides of the airbag module 12 through a screw fastening structure. The other end portions of the plurality of the link plates 13 are coupled to one another by being stacked at a central portion of the airbag module 12 by a connection pin 25 (see FIG. 6).

For example, the first, second and third link plates 13a, 13b and 13c of the link plate assembly 14 are coupled in a "Y" shape. The end portions of the link plates are respectively fastened and fixed to the boss portions 18 of the airbag module 12 while being positioned at the outsides of the airbag module 12 so as to form a triangular arrangement structure.

In this case, a buffering member made of a rubber material may be interposed between the link plates at the fastening portion of the connection pin 25 that binding the link plates 13 together, thereby preventing the link plates from an impact or joint. In addition, a gap may be formed between the link plates so that interference between the link plates does not occur when the horn is operated. Alternatively, a lubricant, in place of the buffering member, may be coated at the portion where the connection pin 25 is fastened, so as to include a smooth operation.

A link plate latching hook 21 substantially vertically protruded from an edge is formed at an end portion of the link plate 13, positioned toward the outside of the airbag module 12. The link plate latching hook 21 performs a function of latching and holding one end portion of the horn spring 11.

Particularly, in some embodiments, a link plate support 15 is provided as a means for performing the seesaw movement of the link plate assembly 14. The link plate support 15, as shown in FIG. 6, is formed to protrude the front side of the steering wheel 10. The link plate support 15 performs a function of supporting a central portion of the length of each link plate 13 while being assigned to each link plate 13 of the link plate assembly 14.

Accordingly, if the end portion of the link plate 13 positioned toward the outside of the airbag module 12 is descended downward, the end portion of the link plate 13 positioned toward the center of the airbag module 12 is ascended upward, thereby performing the seesaw movement. A buffering rubber 20 is attached to a surface of the link plate support 15, so as to prevent impact or abrasion caused by the contact with the link plate 13.

Guide supports 22 disposed in parallel with each other while having the link plate latching hooks 21 at upper portions thereof are substantially vertically formed respectively at both sides of the link plate support 15. As the link plate 13 is inserted between the guide supports 22, the link plate 13 can precisely perform the seesaw movement without the separation of the link plate 13.

Here, the lower-end surface of the link plate latching hook 21 of the guide support 22 has a shape inclined at both sides thereof, in consideration of the operational angle of the link plate, so that it is possible to help the horn with its smooth operation.

Meanwhile, only the steering wheel having the airbag module mounted therein has been described in the present invention. However, in case of a steering wheel having no airbag module mounted therein, the center module may be in the form of a horn cover.

Figure 8A:
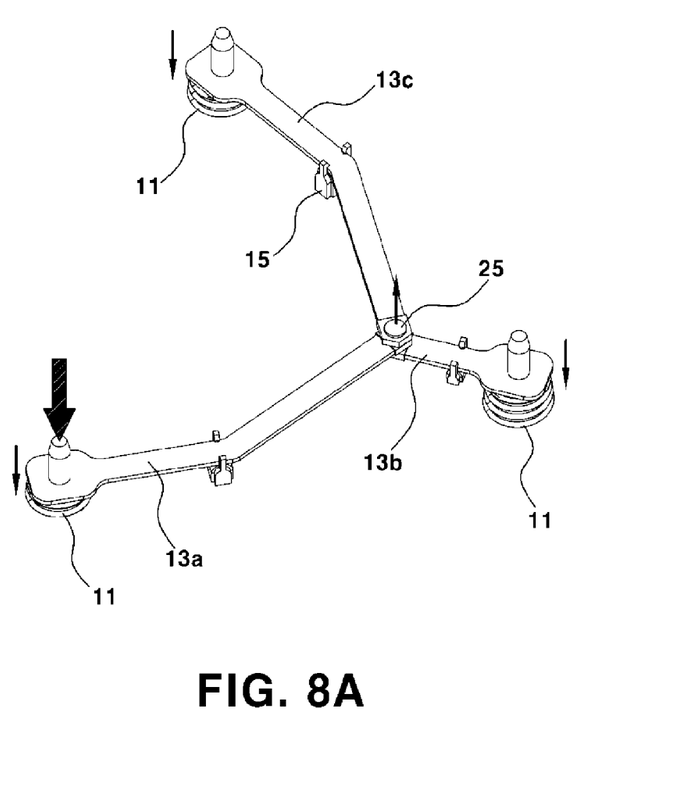
FIGS. 8A and 8B are perspective views showing an operating state of a link plate assembly in the horn switch device according to the present invention.
Figure 8B:
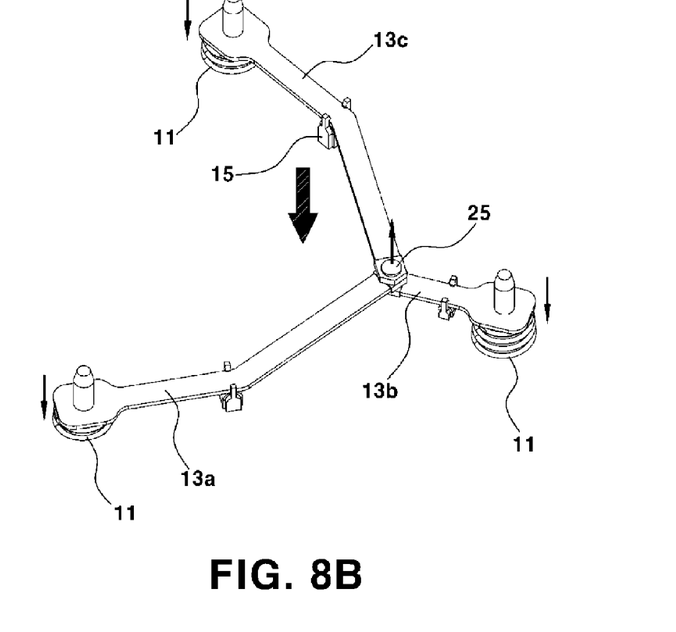

FIGS. 8A and 8B are perspective views showing an operating state of the link plate assembly in the horn switch device according to various embodiments of the present invention. As shown, the link plate assembly is operated with a lever principle that when the driver presses any one portion of the airbag module, one of the link plates connected to one another pushes the other link plates in the reverse direction of a force.

For example, if the driver presses an outer portion of the airbag module, i.e., a portion at which the end portion of the first link plate 13a positioned at an outside of the airbag module is positioned as shown in FIG. 8A, the end portion of the first link plate 13a positioned toward the outside of the airbag module is descended downward, and simultaneously the end portion of the first link plate 13a positioned toward the center of the airbag module is ascended upward by the lever principle.

Thus, all the end portions of the first to third link plates 13a to 13c that are bound together by the connection pin 25 are ascended upward, and simultaneously, the end portions of the second and third link plates 13b and 13c that are positioned toward the outside of the airbag module are also descended downward by the lever principle.

As a result, all the end portions of the first to third link plates 13a to 13c, positioned toward the outside of the airbag module, are descended downward, and simultaneously, the airbag module is also descended downward by being vertically moved. Thus, the module-side horn contact point 16 positioned at the end portion of each of the first to third link plates 13a to 13c is contacted with the wheel-side horn contact point 17 positioned below the module-side horn contact point 16, thereby operating the horn.

If the driver presses a central portion of the airbag module as shown in FIG. 8B, the end portions of the first to third link plates 13a to 13c, positioned toward the outside of the airbag module, are simultaneously descended downward, and the end portions of the first to third link plates 13a to 13c, positioned toward the center of the airbag module, are relatively ascended upward.

Thus, the module-side horn contact point 16 of each of the first to third link plates 13a to 13c, positioned toward the outside of the airbag module, is contacted with the wheel-side horn contact point 17 positioned below the module-side horn contact point 16, thereby operating the horn.

Figure 9:
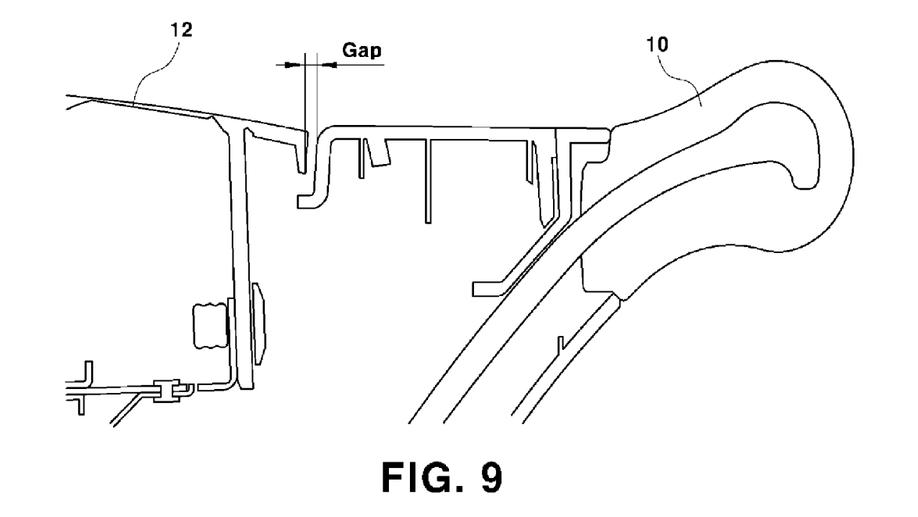
FIG. 9 is a sectional view showing the state of a gap between an airbag module and the steering wheel in the horn switching device according to the present invention.

FIG. 9 is a sectional view showing the state of a gap between the airbag module and the steering wheel in the horn switching device according to various embodiments of the present invention. As shown in FIG. 9, the horn switch device is operated using the method of operating the horn through the vertical movement of the airbag module 12, and accordingly, it is possible to reduce the gap between the steering wheel 10 and the airbag module 12, as compared with the existing method in which a certain gap is necessarily obtained as the horn is operated when one side of the airbag module is inclined.

Thus, it is possible to prevent the inside of the steering wheel from being seen in appearance. Also, it is unnecessary to extend a shield for covering the inside of the steering wheel. Further, the operational trace of the horn switch device is vertically simplified, so that it is possible to improve the degree of freedom in designing the horn switch device.

For convenience in explanation and accurate definition in the appended claims, the terms "upper" or "lower", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A horn switch device for a steering wheel, comprising:
    a center module mounted in an inner region of the steering wheel to perform pressing and restoring operations while being elastically supported by a plurality of horn springs;
    a link plate assembly mounted on a lower surface of the center module and including a plurality of link plates to facilitate a seesaw movement, wherein each link plate includes:
        one end portion fixed to the center module at an outside of the center module,
        the other end portion coupled together with the other end portions of other link plates in the plurality of link plates at a center of the center module, and
        a central portion supported by a link plate support formed in the steering wheel;
    a module-side horn contact point positioned at the fixed end portion of each link plate and toward the outside of the center module; and
    a wheel-side horn contact point positioned below the module-side horn contact point, wherein a horn operation is produced when the wheel-side horn contact point and the module-side horn contact point contact with each other.

2. The horn switch device of claim 1, wherein the link plate assembly includes first, second and third link plates coupled in a "Y" shape while end portions of the first, second and third link plates that are fixed to the center module at the outside of the center module form a triangular arrangement structure.

3. The horn switch device of claim 1, wherein both ends of each horn spring elastically supporting the center module are respectively fixed to the link plate assembly and the steering wheel at positions corresponding to the fixed end portion of each link plate of the link plate assembly.

4. The horn switch device of claim 1, wherein a boss portion of the center module is fixed to the fixed end portion of each link plate and positioned toward the outside of the center module, and
    wherein one end portion of the boss portion that contacts with the link plate is formed with an inclined surface in consideration of a trace of the link plate.

5. The horn switch device of claim 1, wherein a buffering rubber is attached to a surface of the link plate support formed in the steering wheel, thereby preventing impact or abrasion.

6. The horn switch device of claim 5, wherein the link plate support formed in the steering wheel includes guide supports for preventing separation of the link plate, wherein the guide supports are formed substantially vertically from both sides of the link plate support and each has a link plate latching hook formed at an upper-end portion thereof.

7. The horn switch device of claim 1, wherein the link plate support formed in the steering wheel includes guide supports for preventing separation of the link plate, wherein the guide supports are formed substantially vertically from both sides of the link plate support and each has a link plate latching hook formed at an upper-end portion thereof.

8. The horn switch device of claim 1, wherein the center module is an airbag module.

9. The horn switch device of claim 1, wherein the center module is a horn cover.

* * * * *